May 22, 1951     R. O. BATDORF     2,553,889

CLASP FOR WRISTBANDS

Filed May 8, 1948

RICHARD O. BATDORF
Inventor

Glenn S. Fish
Attorney

Patented May 22, 1951

2,553,889

UNITED STATES PATENT OFFICE 2,553,889

CLASP FOR WRISTBANDS

Richard O. Batdorf, Rosalia, Wash.

Application May 8, 1948, Serial No. 25,881

1 Claim. (Cl. 24—225)

My present invention relates to the general class of clasps, or quick detachable fasteners, and more specifically to an improved clasp for wristbands, bracelets, belts, and other articles of jewelry or personal wear. While the invention is well adapted for these purposes and uses, it is especially designed for use with the sectional or flexible band for wrist watches, as illustrated and hereinafter described.

The primary object of the invention is the provision of a separable fastener for the wristband that may with facility be quickly detached for removing the band from the wrist; which may with equal facility be fastened for securely retaining the band on the wrist against accidental displacement; and means are provided whereby the fastener may be manipulated with convenience. The invention involves a minimum number of parts that may be manufactured at low cost of production, and the parts may be assembled with convenience, to insure efficiency in the performance of their functions.

The invention consists in certain novel features of construction and combinations and arrangements of parts embodied in a fastener of the pin, or bar, and hook type, together with a coacting frictional or pressure fastener, as will be described and more particularly set forth in the appended claim.

In the accompanying drawings I have illustrated one example of a physical embodiment of my invention in which the parts are combined and arranged in accord with a mode I have devised for the practical application of the principles of the invention. It will however be understood that changes and alterations are contemplated and may be made in these exemplifying drawings and mechanical structures, within the scope of my claim, without departing from the principles of the invention.

Figure 1:
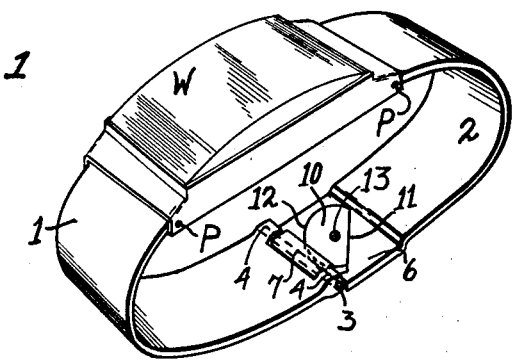
Figure 1 is a perspective view of a wrist watch equipped with a wristband and quick detachable fastener in which my invention is incorporated, with the fastener locked.

In order that the invention may readily be understood I have shown in Fig. 1 a conventionalized watch W that is pivoted at P and P to the adjoining ends of two sections 1 and 2 of a wristband, but it will be understood that other types of flexible, jointed, bands, may be employed with other articles than the watch, and equipped with the fastener of my invention.

The band may be made up of a number of links, and of suitable metal or material, and one of the two sections of the joint, as 1, is provided with a transversely arranged pin or bar 3 that is rigidly mounted at its ends in a pair of spaced lugs 4, 4, integral with the section; and the bar is spaced from the band 1 to provide a cross slot 5 extending between the projecting lugs 4, 4.

The other complementary section 2 at its free end terminates in an offset flat portion 6, and this offset portion terminates in a clasp hook 7 of a width to easily slip through the slot 5 and to fit around a portion of the bar 3, leaving a stretch or rounded side of the bar uncovered and exposed, for frictional engagement by a fastening device.

For retaining the bar or pin within the hook I provide a quick detachable, rotary or swiveled fastener located on the inner face of the offset portion for pressing or frictional engagement with the exposed stretch or rounded side of the bar, and this fastener is manipulated from the exterior or outer face of the band by means of a finger-knob or turn-button 8 having a bevel edge and preferably circular in shape as shown. The knob or button is swiveled or journaled in the offset portion by means of an integral boss 9 that is journaled in a bearing hole of the offset portion of the section 2. At the inner side of the offset portion or flange 6, a flat circular disk 10 is mounted in the plane of the cross pin or bar 3, and the rotary disk is provided with a straight edge 11, and an arcuate or segmental cam edge 12.

The bearing boss 9 is threaded to receive a screw 13 that is passed through a central opening or hole of the disk 10, and the screw is rigidly threaded into the tapped and tubular boss to provide a rigid fastening device that is rotatable, or partially rotatable with relation to the offset or flange of the section 2.

Figure 2:
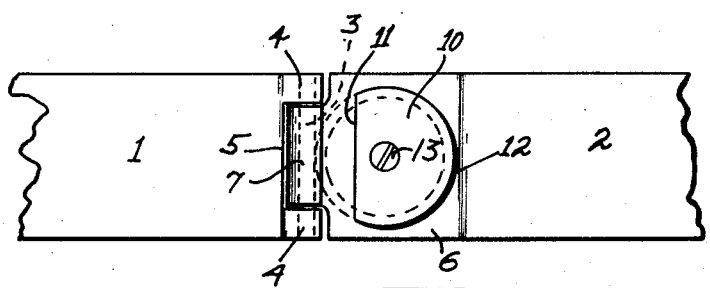
Figure 2 is an inner face view showing the sections of the band hooked together and the fastener separated; and showing by dotted lines the fastener engaged with the hook structure.
Figure 3:
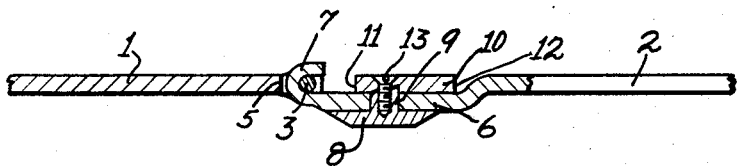
Figure 3 is a sectional detail view through the structure of Fig. 2.

In Fig. 2, by full lines the circular fastener is shown in open position with its straight edge parallel with the pin or bar 3, to provide proper clearance for easily engaging the hook around a portion of the bar or pin. Then, by turning the fastener through movement of the knob or button 8, the circular or cam edge of the disk is brought into contact and frictional engagement with the exposed portion of the bar or pin 3, as indicated by full lines in Fig. 1, and by dotted lines in Fig. 2. The hook is thus securely engaged with the cross bar or pin to provide a flexible joint, and to unite the two free ends of the sectional band. By a turning motion applied to the knob or button the fastener may be manipulated to free the pin or bar, and then the hook may readily be detached for removal of the wristband from the wrist.

Having thus fully described my invention, what I claim as new and desire to secure by Letters Patent is:

In a quick detachable fastener for a sectional wrist-band, the combination with one section having a pair of laterally spaced lugs and a transversely arranged bar connecting the lugs, and a second section having an offset portion forming a seat and terminating in a hook partially enclosing the bar, of a turning knob having a boss swiveled in the offset portion, a flat fastening disk mounted in the seat and a screw rigidly uniting the disk and boss, said disk having an arcuate cam edge adapted to frictionally engage an adjacent exposed portion of the bar between the lugs for locking the bar in the hook and a cut-away portion forming a straight edge adapted to be turned into parallelism with the bar to permit disengagement of the hook and bar.

RICHARD O. BATDORF.

REFERENCES CITED

The following references are of record in the file of this patent:

UNITED STATES PATENTS

| Number | Name | Date |
|---|---|---|
| 369,067 | Macmillan | Aug. 30, 1887 |
| 447,876 | Hayden | Mar. 10, 1891 |
| 768,069 | O'Brien | Aug. 23, 1904 |
| 872,270 | Bellinger | Nov. 26, 1907 |
| 948,354 | Tappan | Feb. 8, 1910 |
| 1,350,033 | Monroe | Aug. 17, 1920 |
| 1,397,568 | Williams | Nov. 22, 1921 |
| 1,419,060 | Knowles | June 6, 1922 |